United States Patent Office.

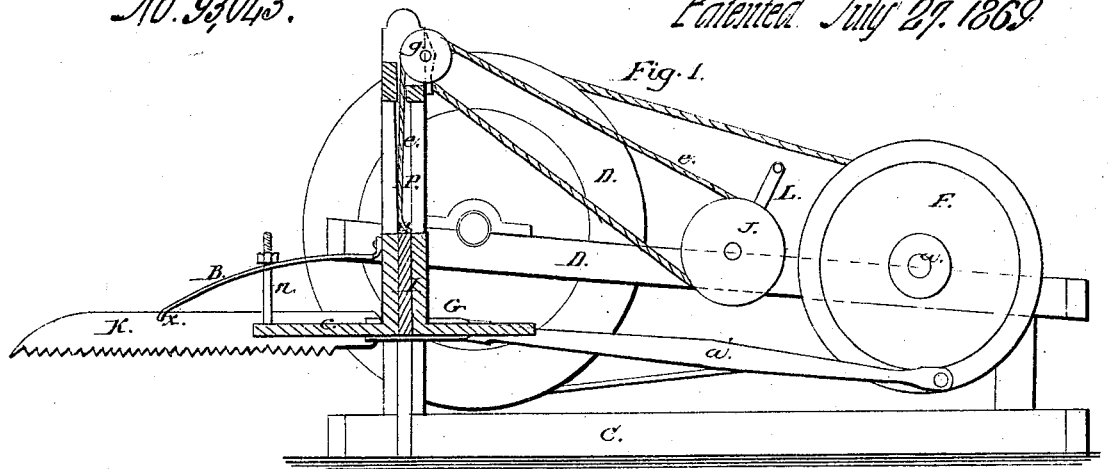
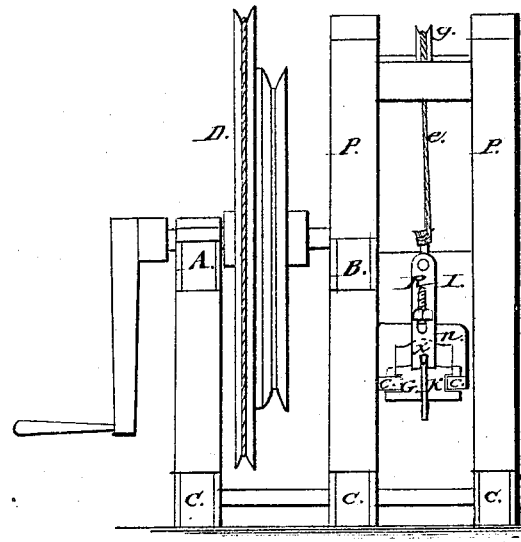

GEORGE W. BENSON AND FRANK F. DOLAND, OF SACRAMENTO, CALIFORNIA.

Letters Patent No. 93,043, dated July 27, 1869.

IMPROVEMENT IN SAWING-MACHINE.

The Schedule referred to in these Letters Patent and making part of the same.

*To all whom it may concern:*

Be it known that we, GEORGE W. BENSON and FRANK F. DOLAND, of the city and county of Sacramento, and State of California, have invented an Improved Portable Sawing-Machine; and we do hereby declare the following description and accompanying drawings are sufficient to enable any person skilled in the art or science to which it most nearly appertains, to make and use our said invention or improvements without further invention or experiment.

Our invention relates to certain new and useful improvements in portable crosscut-sawing machines, whereby the saw is fed automatically to the wood to be cut, so that the amount of feed required will be given at each stroke of the saw, regularly and evenly, without any extra exertion of the operator; and It consists in placing the saw in a slide, which moves back and forward in ways. Directly above the slide, we place a block, which moves up and down with the slide. A spring extends out over the saw, its opposite end being secured to the block, so that the end of the spring is always pressing down upon the saw, the block being carried downward as the saw is fed to the wood, and consequently keeping the spring, at all times, bearing upon the saw.

To more fully illustrate and explain our invention, reference is had to the accompanying drawings, forming a part of this specification, of which—

Figure 1 is a side elevation.

Figure 2 is an end view.

Similar letters of reference, in each of the figures, indicate like parts.

A and B are two parallel timbers, supported by upright posts, at a little distance apart, upon a suitable foundation or frame, C.

A driving-pulley, D, is arranged to revolve between the two parallel timbers, at one end, by means of a crank, or otherwise.

At the opposite end of the timbers is a shaft, a, bearing on the parallel timbers, and carrying, between the timbers, the small pulley, and on the outer end the disk F.

The pulley and disk F are driven by an endless belt passing around the driving-pulley D.

A connecting-rod, a', is attached to disk F, by means of a crank-pin, and the opposite end attached to a slide, G.

The slide G moves on ways c c, on the lower end of a block, I, which is arranged to move up and down in ways between two upright standards P P, the ways c c being sufficiently long to accommodate the reciprocating slide to the throw of the eccentric-pin on the disk F.

The saw K is attached to the front end of the slide G, and moves with it.

Between the driving-pulley D and the small pulley on the parallel timbers is a pulley, J, operated by a crank, L, within easy reach of the operator.

A cord, e, passes around this pulley, up and around the pulley g, in the upright standards P P, and is attached to the sliding block I, by means of which the saw is elevated, after it has passed through the log to the ground.

The weight of the block and saw is calculated to be sufficient to feed the saw and block downward as the saw cuts.

The saw is kept to its work regularly by a flat metal spring, R, which is attached to the block I, above the saw, and rests upon a yoke, n, which is placed at the end of the slide, the end curving downward toward the saw.

The end of the spring is slotted, at x, inside of which the back of the saw moves.

This spring moves downward with the block, and always bears upon it, keeping it to its work with a steady and regular pressure.

By this means, we have a wood-sawing machine which can be moved from place to place, as desired, as it can be made very light. A man or boy can operate it with ease, and it can easily be arranged to be run by dog or other power, after it is once placed in position, if desired.

Having thus described our invention,

What we claim, and desire to secure by Letters Patent, is—

In combination with the sliding block I, the spring R, when secured to the block, so as to rise and fall with it, substantially as set forth.

In witness whereof, we have hereunto set our hands and seals.

GEORGE W. BENSON. [L. S.]
FRANK F. DOLAND. [L. S.]

Witnesses:
SAMUEL CROSS,
GEORGE RIDLEY.